US010743086B2

(12) United States Patent
Lu et al.

(10) Patent No.: US 10,743,086 B2
(45) Date of Patent: Aug. 11, 2020

(54) ELECTRONIC DEVICE AND METHOD FOR SHARING STREAMING VIDEO (71) Applicant: Chiun Mai Communication Systems, Inc., New Taipei (TW)

(72) Inventors: Wei-Li Lu, New Taipei (TW); Jeng-An Lin, New Taipei (TW); Ting-Hao Chung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 77 days.

(21) Appl. No.: 15/891,588

(22) Filed: Feb. 8, 2018

(65) Prior Publication Data
US 2019/0058927 A1  Feb. 21, 2019

(30) Foreign Application Priority Data

Aug. 15, 2017 (CN) .......................... 2017 1 0697688

(51) Int. Cl.
*H04L 29/06* (2006.01)
*H04N 21/854* (2011.01)
*H04N 21/234* (2011.01)
*H04N 21/233* (2011.01)
*G06F 3/01* (2006.01)
*H04N 5/44* (2011.01)
*H04N 21/4788* (2011.01)
(Continued)

(52) U.S. Cl.
CPC ............ *H04N 21/854* (2013.01); *G06F 3/01* (2013.01); *H04L 65/4069* (2013.01); *H04L 65/4076* (2013.01); *H04L 65/602* (2013.01); *H04L 65/607* (2013.01); *H04N 5/4401* (2013.01); *H04N 7/142* (2013.01); *H04N 7/147* (2013.01); *H04N 7/152* (2013.01); *H04N 21/21805* (2013.01); *H04N 21/233* (2013.01); *H04N 21/234* (2013.01); *H04N 21/2343* (2013.01); *H04N 21/4223* (2013.01); *H04N 21/4788* (2013.01); *H04N 5/04* (2013.01); *H04N 2007/145* (2013.01)

(58) Field of Classification Search
CPC ........................ H04L 65/4069; H04L 65/4076
See application file for complete search history.

(56) References Cited

U.S. PATENT DOCUMENTS 7,480,382 B2   1/2009  Dunbar et al.
8,702,517 B2   4/2014  Walker et al.
2016/0014413 A1*  1/2016  Sato .................... H04N 19/119
                                                    375/240.12

FOREIGN PATENT DOCUMENTS

CN       103248807 A    8/2013
CN       104104872 A   10/2014
CN       205212983 U    5/2016

\* cited by examiner

Primary Examiner — Adnan M Mirza
(74) Attorney, Agent, or Firm — ScienBiziP, P.C.

(57) ABSTRACT

A method of creating and sharing a streaming video to other devices by an electronic device, which comprises a first camera and a second camera, is disclosed. A voice signal collected by the electronic device is encoded into digital audio data. The first camera captures first still images and the second camera captures second still images simultaneously. The first still images and/or the second still images are cropped and combined to generate combined images. The combined images are encoded into encoded images with a predetermined format. A streaming video is obtained by mixing the encoded images with the digital audio data and transmitted to other remote devices.

13 Claims, 7 Drawing Sheets

(51) Int. Cl.
*H04N 21/4223* (2011.01)
*H04N 7/15* (2006.01)
*H04N 7/14* (2006.01)
*H04N 21/2343* (2011.01)
*H04N 21/218* (2011.01)
*H04N 5/04* (2006.01)

ELECTRONIC DEVICE AND METHOD FOR SHARING STREAMING VIDEO

CROSS-REFERENCE TO RELATED APPLICATIONS

This application claims priority to Chinese Patent Application No. 201710697688.7 filed on Aug. 15, 2017, the contents of which are incorporated by reference herein.

FIELD

The subject matter herein generally relates to managing technology, and particularly to an electronic device and a method of sharing streaming video with other electronic devices.

BACKGROUND

In portable electronic devices, a streaming video captured by a front camera and a streaming video captured by a rear camera cannot be simultaneously shared with others in real time. Therefore, there is a room to improve the field.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
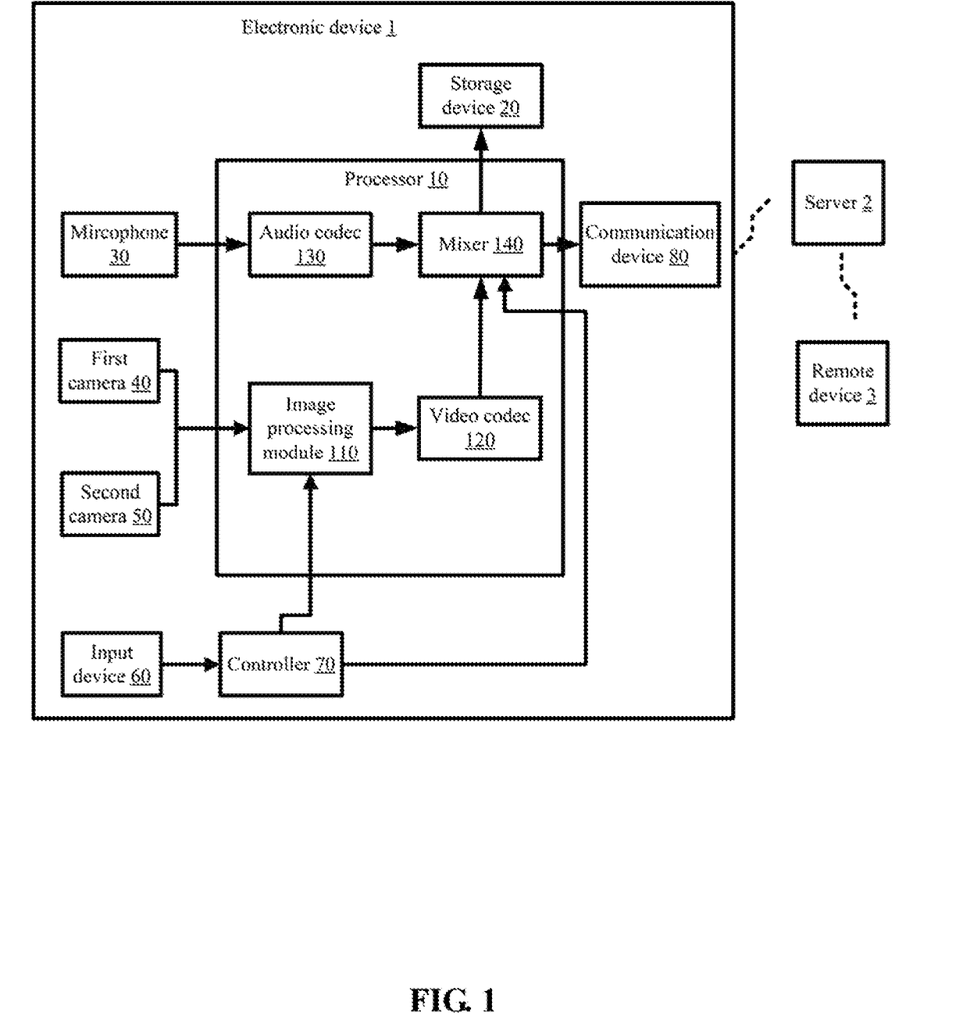
FIG. 1 illustrates a block diagram of one exemplary embodiment of an electronic device.

FIG. 1 illustrates a block diagram of one exemplary embodiment of an electronic device. In the exemplary embodiment, an electronic device 1 can include, but is not limited to, a processor 10, a storage device 20, a microphone 30, a first camera 40, a second camera 50, an input device 60, a controller 70, and a communication device 80. The above components are electrically connected with one another. In at least one exemplary embodiment, the electronic device 1 can be a mobile phone, a tablet computer, or any other suitable device.

The processor 10 can be a central processing unit, a microprocessor, or any other suitable chip having data processing function.

In at least one exemplary embodiment, the storage device 20 can be an internal storage device built in the electronic device 1. In other exemplary embodiments, the storage device 20 can be an external storage device removably connected to the electronic device 1. For example, the storage device 20 can be a smart media card, a secure digital card, a flash card.

The microphone 30 can collect a voice signal. The first camera 40 and the second camera 50 can respectively be a rear camera and a front camera of the electronic device 1.

In at least one exemplary embodiment, the first camera 40 and the second camera 50 have different pixels. In at least one exemplary embodiment, a quantity of the pixels of the first camera 40 is greater than a quantity of the pixels of the second camera 50.

The input device 60 can receive input by a user. In at least one exemplary embodiment, the input device 60 can be a touch display that can generate touch signals in response to user inputs. In other exemplary embodiments, the input device 60 can be a key that can generate a press signal when the key is pressed.

The controller 70 can generate control signals in response to user input through the input device 60. The communication device 80 can be a wireless communication device. For example, the communication device 80 can be a WIFI device, or a BLUETOOTH device. The electronic device 1 can transmit request signals using the communication device 80. For example, the electronic device 1 can send a request signal to a server 2 for requesting the server 2 to establish a transmitting channel between the electronic device 1 and a remote device 3. In at least one exemplary embodiment, the server 2 can be a server for a social media application, e.g.

FACEBOOK, installed in the electronic device 1. The remote device 3 can be a mobile phone or a computer.

In at least one exemplary embodiment, the processor 10 can include, but is not limited to, an image processing module 110, a video codec 120, an audio codec 130, and a mixer 140.

In at least one exemplary embodiment, the image processing module 110 can control the first camera 40 to capture a plurality of first still images and the second camera 50 to capture a plurality of second still images, and may crop the first still images and/or the second still images. In this embodiment, the image processing module 110 can combine the first still images, which have been cropped, and the second still images, which have been cropped or not been cropped. The image processing module 110 can then transmit the combined images to the video codec 120.

Figure 2:
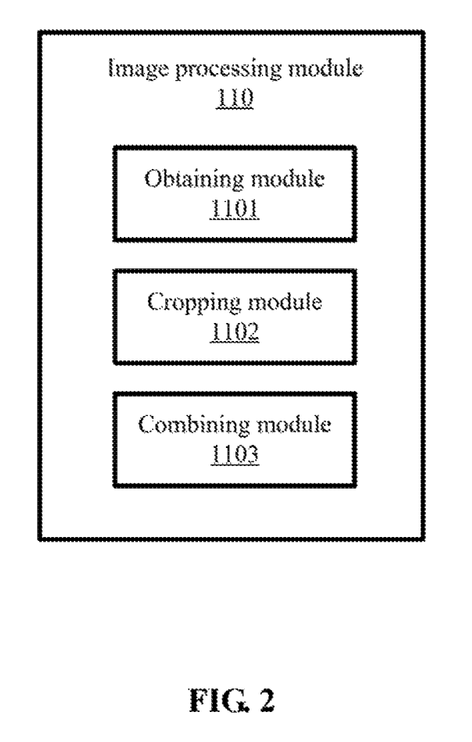
FIG. 2 illustrates a block diagram of one exemplary embodiment of modules of an image processing module included in the electronic device of FIG. 1.

In at least one exemplary embodiment, the image processing module 110 can be a graphics processor integrated inside the processor 10. In other exemplary embodiments, the image processing module 110 can be a software module that can be executed by the processor 10. As illustrated in FIG. 2, in at least one exemplary embodiment, the image processing module 110 can include, but is not limited to, an obtaining module 1101, a cropping module 1102, and a combining module 1103. The modules 1101-1103 can be software instructions which can be stored in the storage device 20 and executed by the processor 10 or the graphics processor. In other exemplary embodiments, the modules 1101-1103 can be firmware.

The video codec 120 can encode each combined image into an encoded image with a predetermined format (e.g., MPEG4 format) such that a plurality of encoded images with the predetermined format are obtained. The video codec 120 can transmit each encoded image to the mixer 140.

In at least one exemplary embodiment, the microphone 30 can collect a voice signal and transmit the voice signal to the audio codec 130. The audio codec 130 can encode the voice signal into digital audio data and transmit the digital audio data to the mixer 140.

In at least one exemplary embodiment, the mixer 140 can mix each encoded image with the digital audio data to generate a streaming video. In at least one exemplary embodiment, the mixer 140 can, in response to user input, mix each encoded image with the digital audio data to generate the streaming video. The streaming video can be stored in the storage device 20. The mixer 140 can further transmit the streaming video to the communication device 80. The communication device 80 can transmit the streaming video to the remote device 3 through the transmitting channel established by the server 2 between the electronic device 1 and the remote device 3, such that the electronic device 1 can share the streaming video with the remote device 3.

Figure 3:
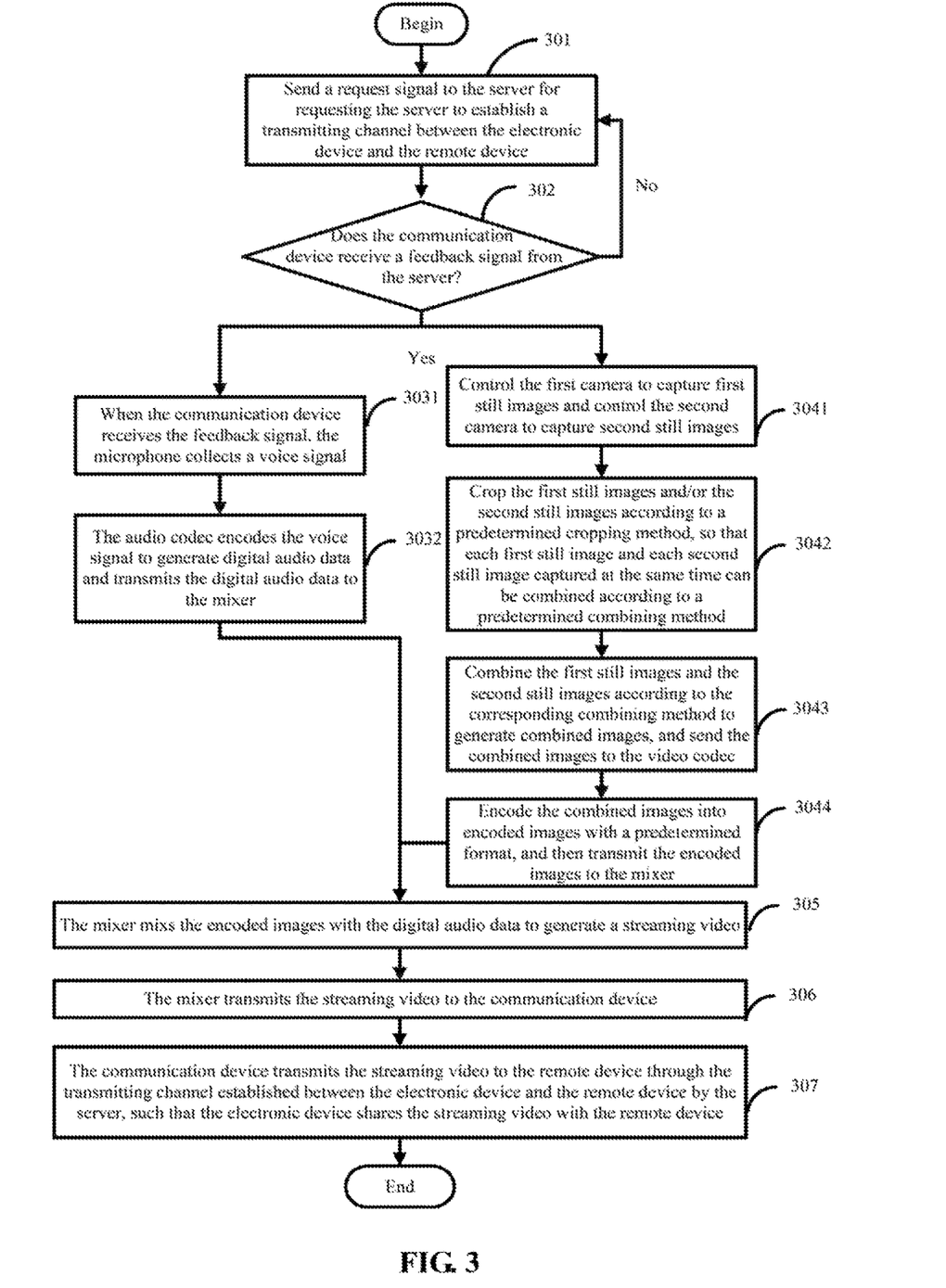
FIG. 3 illustrates a flow chart of one exemplary embodiment of a method of transmitting a streaming video.

FIG. 3 illustrates a flowchart presented in accordance with an example embodiment. The exemplary method 300 is provided by way of example, as there are a variety of ways to carry out the method. The method 300 described below can be carried out using the configurations illustrated in FIG. 1, for example, and various elements of these figures are referenced in explaining exemplary method 300. Each block shown in FIG. 3 represents one or more processes, methods, or subroutines, carried out in the exemplary method 300. Additionally, the illustrated order of blocks is by example only and the order of the blocks can be changed. The exemplary method 300 can begin at block 301. Depending on the embodiment, additional steps can be added, and the ordering of the steps can be changed.

At block 301, the electronic device 1 can send a request signal to the server 2 for requesting the server 2 to establish a transmitting channel between the electronic device 1 and the remote device 3. The electronic device 1 can send the request signal to the server 2 through the communication device 80.

In at least one exemplary embodiment, the electronic device 1 can send the request signal in response to a first control signal generated by the controller 70.

For example, when the input device 60 is the touch display, the touch display can generate a first touch signal in response to a user touch on a first predetermined object (e.g., a live streaming play icon) displayed on the touch display. The controller 70 can generate the first control signal in response to the first touch signal.

At block 302, the electronic device 1 can determine whether the communication device 80 receives a feedback signal from the server 2. The feedback signal indicates that the server 2 has established the transmitting channel. The feedback signal can include information associated with the transmitting channel. For example, the information can be a network address of the transmitting channel. When communication device 80 receives the feedback signal, the process goes to blocks 3031 and 3041. When the communication device 80 does not receive the feedback signal, the process returns to block 301.

At block 3031, when the communication device 80 receives the feedback signal, the microphone 30 collects a voice signal.

At block 3032, the audio codec 130 encodes the voice signal to generate digital audio data. The audio codec 130 transmits the digital audio data to the mixer 140.

In at least one exemplary embodiment, when the audio codec 130 encodes the voice signal, the audio codec 130 can insert collecting time of collecting the voice signal into the digital audio data, such that the digital audio data includes the collecting time.

At block 3041, when the communication device 80 receives the feedback signal, the obtaining module 1101 can control the first camera 40 to capture first still images and can control the second camera 50 to capture second still images.

Figure 4A:
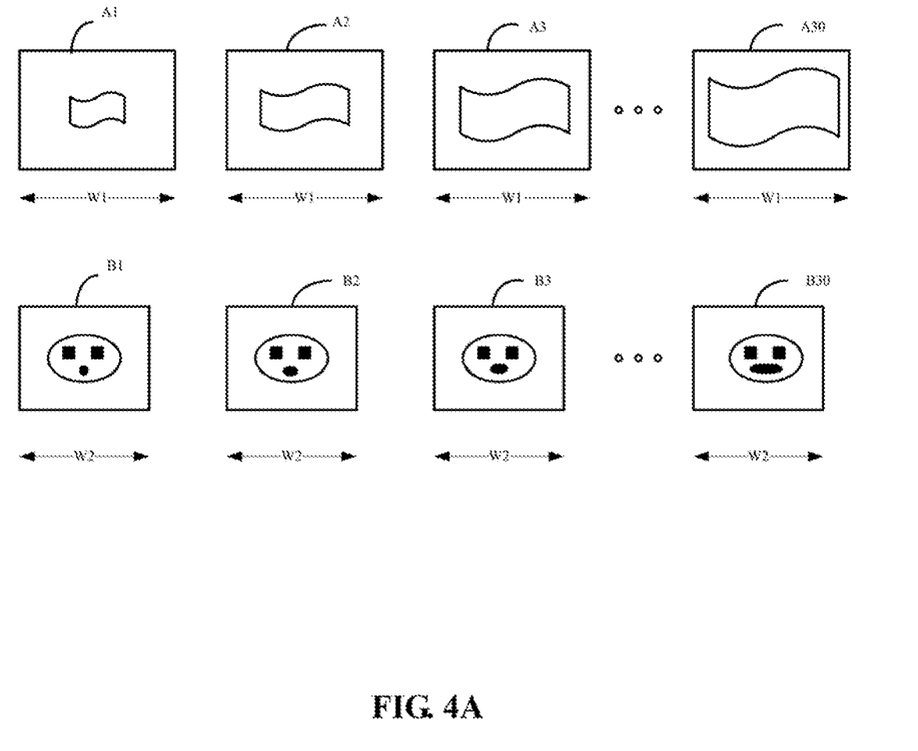
FIG. 4A illustrates an example of thirty still images captured by a first camera and thirty still images captured by a second camera.

For example, as shown in FIG. 4A, the first camera 40 captures thirty still images (e.g., "A1", "A2", "A3" . . . "A30") within a first second and the second camera 50 captures thirty still images (e.g., "B1", "B2", "B3" . . . "B30") within the first second. The first still image "A1" and the second still image "B1" are captured at the same time. The first still image "A2" and the second still image "B2" are captured at the same time. The first still image "A3" and the second still image "B3" are captured at the same time, and so on. Accordingly, the first still image "A30" and the second still image "B30" are captured at the same time. In at least one exemplary embodiment, the quantity of pixels of the first camera 40 is greater than the quantity of pixels of the second camera 50, and a first width "W1" of each first still image is greater than a second width "W2" of each second still image.

At block 3042, the cropping module 1102 can crop the first still images and/or the second still images according to a predetermined cropping method, so that each first still image and each second still image captured at the same time can be combined according to a predetermined combining method.

In at least one exemplary embodiment, the predetermined cropping method can be one of the following three cropping methods.

A first cropping method includes cropping the first still images and/or the second still images, so that the first width "W1" of each first still image equals the second width "W2" of each second still image.

For a first example, when the first width "W1" of each first still image is greater than the second width "W2" of each second still image, the cropping module 1102 can reduce the overall size of the first still image based on a central point of the first still image, so that the first width "W1" of the first still image is equal to the second width "W2" of the second still image.

Figure 4B:
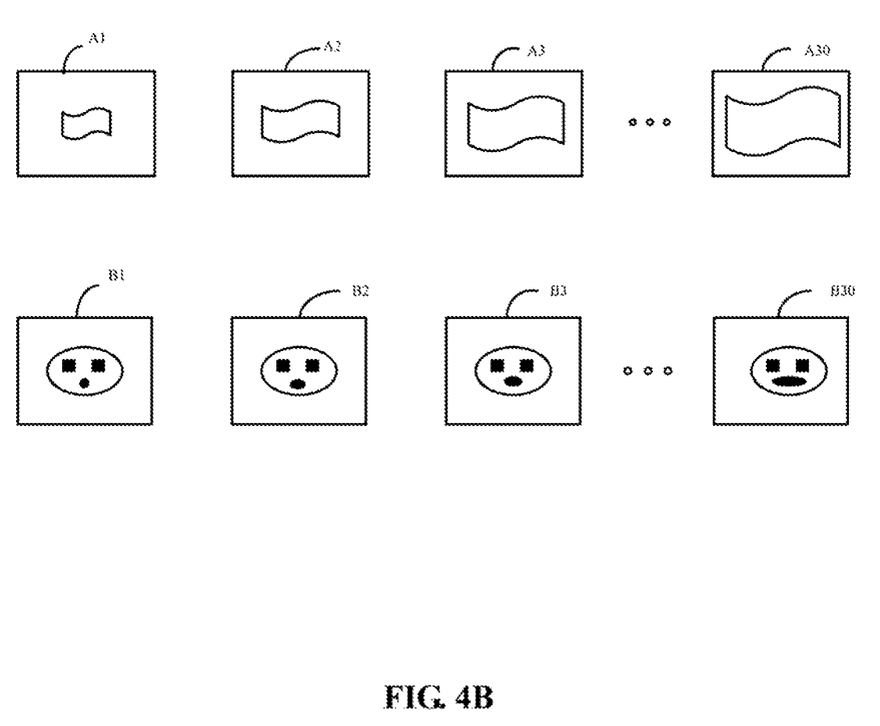
FIG. 4B illustrates an example of adjusting a width of each of the thirty still images captured by the first camera.

For example, as shown in FIG. 4A, the cropping module 1102 can reduce the size of each of the thirty still images "A1", "A2", "A3" . . . "A30" based on the central point of each of the thirty images "A1", "A2", "A3" . . . "A30", so that the first width "W1" of each of the thirty still images "A1", "A2", "A3" . . . "A30" is equal to the second width "W2" of each of the thirty still images "B1", "B2", "B3" . . . "B30" as shown in FIG. 4B.

For a second example, as shown in FIG. 4A, when the first width "W1" of each first still image is greater than the second width "W2" of each second still image, the cropping module 1102 can enlarge the second still image based on a central point of the second still image, so that the second width "W2" of the second still image is equal to the first width "W1" of the first still image.

For a third example, as shown in FIG. 4A, when the first width "W1" of each first still image is greater than the second width "W2" of each second still image, the cropping module 1102 can directly crop a left side and a right side of the first still image, so that the first width "W1" of the first still image is equal to the second width "W2" of the second still image.

A second cropping method includes cropping the first still images and/or the second still images, so that a first height of each first still image is equal to a second height of each second still image.

For a first example, when the first height of each first still image is greater than the second height of each second still image, the cropping module 1102 can reduce the first still image based on the central point of the first still image, so that the first height of the first still image is equal to the second height of the second still image.

For a second example, when the first height of each first still image is greater than the second height of each second still image, the cropping module 1102 can enlarge the second still image based on the central point of the second still image, so that the second height of the second still image is equal to the first height of the first still image.

For a third example, when the first height of each first still image is greater than the second height of each second still image, the cropping module 1102 can directly crop a top side and a bottom side of the first still image, so that the first height of the first still image is equal to the second height of the second still image.

A third cropping method includes cropping the first still images and/or the second still images, so that the first width of each first still image is equal to the second width of each second still image, and so that the first height of each first still image is equal to the second height of each second still image.

For example, when the first width of each first still image is greater than the second width of each second still image, and the first height of each first still image is greater than the second height of each second still image, the cropping module 1102 can crop the left side and the right side of the first still image, so that the first width of the first still image is equal to the second width of the second still image. The cropping module 1102 can also crop the top side and the bottom side of the first still image, so that the first height of the first still image is equal to the second height of the second still image.

In at least one exemplary embodiment, when the first cropping method is adopted by the cropping module 1102, a first combining method can be adopted to combine each first still image and each second still image captured at the same time. The first combining method indicates that each first still image and each second still image are combined in a vertical direction.

In at least one exemplary embodiment, when the second cropping method is adopted by the cropping module 1102, a second combining method can be adopted to combine each first still image and each second still image captured at the same time. The second combining method indicates that each first still image and each second still image are combined in a horizontal direction.

In at least one exemplary embodiment, when the third cropping method is adopted by the cropping module 1102, the first or the second combining method can be adopted to combine each first still image and each second still image captured at the same time. In other words, each first still image and each second still image can be combined in the vertical direction or the horizontal direction.

At block 3043, the combining module 1103 can combine the first still images and the second still images according to the corresponding combining method to generate combined images. The combining module 1103 can send the combined images to the video codec 120.

In at least one exemplary embodiment, the combining module 1103 can combine each first still image and each second still image captured at the same time, to generate a combined image.

Figure 4C:
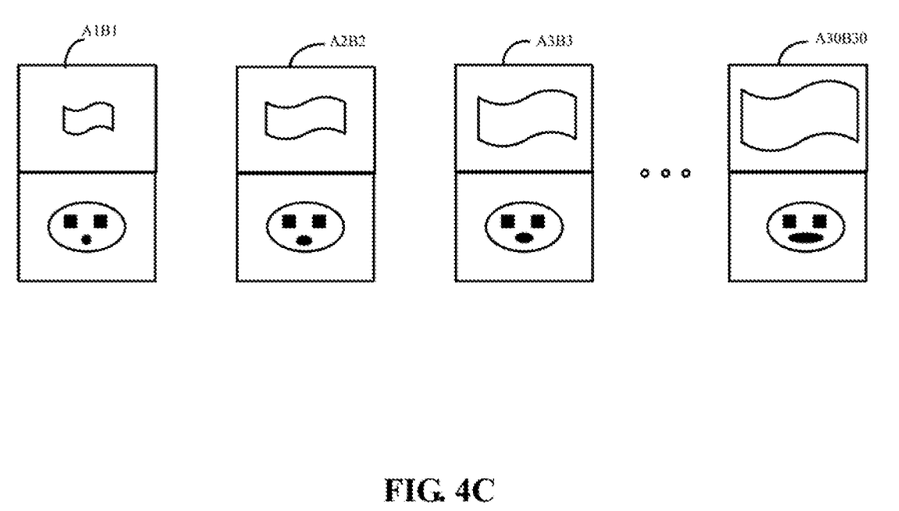
FIG. 4C illustrates an example of combining the still images captured by the first camera and the still images captured by the second camera.

For example, when the first cropping method is adopted by the cropping module 1102, the combining module 1103 can combine the first still image and the second still image in the vertical direction. As shown in FIG. 4C, the combining module 1103 can combine the first still image "A1" and the second still image "B1", which are captured at the same time, in the vertical direction to generate a first combined image "A1B1". The combining module 1103 can combine the first still image "A2" and the second still image "B2", which are captured at the same time, in the vertical direction to generate a second combined image "A2B2". The combining module 1103 can combine the first still image "A3" and the second still image "B3", which are captured at the same time, in the vertical direction to generate a third combined image "A3B3". Similarly, the combining module 1103 can combine the first still image "A30" and the second still image "B30", which are captured at the same time, in the vertical direction to generate a combined image "A30B30".

At block 3044, the video codec 120 can encode the combined images into encoded images with a predetermined format (e.g., MPEG4 format), and then transmit the encoded images to the mixer 140.

For example, the video codec 120 can encode the thirty combined images "A1B1", "A2B2", "A3B3" . . . "A30B30" into images of MPEG4 format, and then transmit the thirty images of MPEG4 format to the mixer 40.

At block 305, the mixer 40 can mix the encoded images with the digital audio data to generate a streaming video.

In at least one exemplary embodiment, the mixer 140 can, based on time of capturing the first and second still images and time of collecting the digital audio data, mix the encoded images with the digital audio data to generate a streaming video. In other words, each encoded image includes one of the first still images and one of the second still images which are combined and captured at the same time; and the mixer 140 can mix the first and second still images of the encoded images and the digital audio data, which are captured and collected respectively at the same time, so as to generate the streaming video.

For example, the mixer 140 can mix the thirty images of MPEG4 format with the digital audio data that is collected in the first second to generate a streaming video. As mentioned above, the time of capturing the thirty images of MPEG4 format is within the first second.

In at least one exemplary embodiment, the mixer 140 can store the streaming video in the storage device 20 when it receives a second control signal generated by the controller 70.

For example, when the input device 60 is a touch display, the touch display can generate a second touch signal in response to a touch on a second predetermined object (e.g., an icon) displayed on the touch display, and the controller 70 can generate the second control signal in response to the second touch signal.

At block 306, the mixer 140 can further transmit the streaming video to the communication device 80.

At block 307, the communication device 80 can transmit the streaming video to the remote device 3 through the transmitting channel established between the electronic device 1 and the remote device 3 by the server 2, such that the electronic device 1 shares the streaming video with the remote device 3.

In at least one exemplary embodiment, the image processing module 110 can change the combining method for combing each first still image and each second still image when a third control signal generated by the controller 70 is received.

Figure 5:
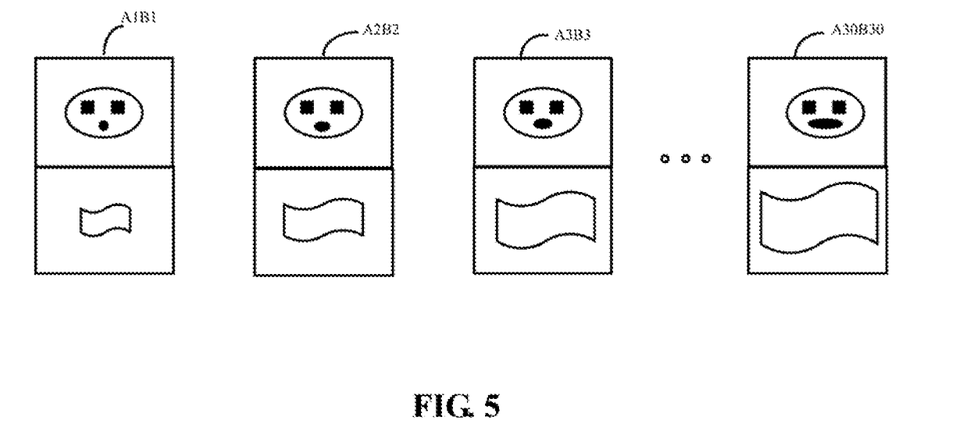
FIG. 5 illustrates an example of switching positions of the still images captured by the first camera and positions of the still images captured by the second camera in combined images.

For example, as shown in FIG. 4C, when the input device 60 is the touch display, the touch display can generate a third touch signal in response to a user touch on the first combined image "A1B1" displayed on the touch display. The controller 70 can generate the third control signal in responses to the third touch signal. In response to the third control signal, the combining module 1103 of the image processing module 110 can then switch positions of the first still image and the second still image in each of the combined images "A1B1", "A2B2", "A3B3" . . . "A30B30" as shown in FIG. 5.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
a first camera for capturing first still images;
a second camera for capturing second still images;
a microphone for collecting a voice signal;
an audio codec for encoding the voice signal to generate digital audio data;
an image processing module comprising:
an obtaining module for controlling the first camera to capture the first still images and controlling the second camera to capture the second still images;
a cropping module for adjusting a first width of each of the first still images to be equal to a second width of each of the second still images; or adjusting a first height of each of the first still images to be equal to a second height of each of the second still images; and
a combining module for generating combined images by combining the first still images and the second still images in a vertical direction when the first width of each of the first still images equals the second width of each of the second still images; or generating combined images by combining the first still images and the second still images in a horizontal direction when the first height of each of the first still images equals the second height of each of the second still images;
a video codec for encoding the combined images to generate encoded images with a predetermined format;
a mixer for mixing the encoded images with the digital audio data to generate a streaming video; and
a communication device for transmitting the streaming video to a remote device.

2. The electronic device according to claim 1, further comprising a processor and a storage device, wherein the obtaining module, the cropping module and the combining module are implemented as software modules, stored in the storage device and executed by the processor.

3. The electronic device according to claim 1, wherein the communication device sends a server a request signal for requesting the server to establish a transmitting channel between the electronic device and the remote device; and
wherein the communication device transmits the streaming video to the remote device via the transmitting channel.

4. The electronic device according to claim 1, wherein the audio codec inserts time of collecting the voice signal into the digital audio data;
wherein each encoded image includes one of the first still images and one of the second still images which are combined and captured at the same time; and
wherein the first and second still images of the encoded images and the digital audio data mixed by the mixer are captured and collected respectively at the same time.

5. The electronic device according to claim 1, wherein the adjusting of the first width of each of the first still images to be equal to the second width of each of the second still images comprises:
reducing an overall size of each first still image based on a central point of each first still image, or enlarging each second still image based on a central point of each second still image, when the first width of each first still image is greater than the second width of each second still image.

6. The electronic device according to claim 1, wherein a quantity of pixels of the first camera is greater than a quantity of pixels of the second camera.

7. The electronic device according to claim 1, further comprising:
an input device for generating an input signal in response to an user input; and
a controller for generating a control signal in response to the input signal, wherein the combining module switches positions of the first still image and the second still image in each of the combined images in response to the control signal.

8. A method of sharing a streaming video applied to an electronic device, which comprises a first camera and a second camera, the method comprising:
- collecting a voice signal;
- encoding the voice signal to generate digital audio data;
- controlling the first camera to capture first still images and controlling the second camera to capture second still images;
- adjusting a first width of each of the first still images to be equal to a second width of each of the second still images; or adjusting a first height of each of the first still images to be equal to a second height of each of the second still images; and
- generating combined images by combining the first still images and the second still images in a vertical direction when the first width of each of the first still images equals the second width of each of the second still images; or generating combined images by combining the first still images and the second still images in a horizontal direction when the first height of each of the first still images equals the second height of each of the second still images;
- encoding the combined images to generate encoded images with a predetermined format;
- mixing the encoded images with the digital audio data to generate a streaming video; and
- transmitting the streaming video to a remote device.

9. The method according to claim 8, further comprising:
- sending a server a request signal for requesting the server to establish a transmitting channel between the electronic device and the remote device; and
- transmitting the streaming video to the remote device via the transmitting channel.

10. The method according to claim 8, further comprising:
- inserting time of collecting the voice signal into the digital audio data, wherein each encoded image includes one of the first still images and one of the second still images which are combined and captured at the same time; and
- wherein the mixing step further comprises mixing the first and second still images of the encoded images and the digital audio data, which are captured and collected respectively at the same time.

11. The method according to claim 8, wherein the adjusting of the first width of each of the first still images to be equal to the second width of each of the second still images comprises:
- reducing an overall size of each first still image based on a central point of each first still image, or enlarging each second still image based on a central point of each second still image, when the first width of each first still image is greater than the second width of each second still image.

12. The method according to claim 8, wherein a quantity of pixels of the first camera is greater than a quantity of pixels of the second camera.

13. The method according to claim 8, further comprising:
- generating an input signal in response to an user input;
- generating a control signal in response to the input signal; and
- switching positions of the first still image and the second still image in each of the combined images in response to the control signal.

* * * * *